United States Patent
Machet et al.

(10) Patent No.: US 10,756,594 B2
(45) Date of Patent: Aug. 25, 2020

(54) ELECTRIC MACHINE COMPRISING NOISE-REDUCING MEANS

(71) Applicant: Valeo Systemes de Controle Moteur, Cergy Saint Christophe (FR)

(72) Inventors: François Machet, Poissy (FR); Patrick Lebrasseur, Montagny en Vexin (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 707 days.

(21) Appl. No.: 15/519,998

(22) PCT Filed: Oct. 19, 2015

(86) PCT No.: PCT/FR2015/052801
§ 371 (c)(1),
(2) Date: Aug. 15, 2017

(87) PCT Pub. No.: WO2016/062955
PCT Pub. Date: Apr. 28, 2016

(65) Prior Publication Data
US 2018/0041091 A1 Feb. 8, 2018

(30) Foreign Application Priority Data

Oct. 20, 2014 (FR) ..................... 14 60048

(51) Int. Cl.
*H02K 5/24* (2006.01)
*F02B 39/10* (2006.01)
*F02B 37/04* (2006.01)
*H02K 1/18* (2006.01)
*H02K 1/14* (2006.01)
(Continued)

(52) U.S. Cl.
CPC ............... *H02K 5/24* (2013.01); *F02B 37/04* (2013.01); *F02B 39/10* (2013.01); *F04D 25/06* (2013.01); *F04D 29/663* (2013.01); *H02K 1/146* (2013.01); *H02K 1/148* (2013.01); *H02K 1/185* (2013.01); *H02K 1/246* (2013.01); *H02K 1/2753* (2013.01); *H02K 19/103* (2013.01); *Y02T 10/144* (2013.01)

(58) Field of Classification Search
CPC ....................................................... H02K 5/24
See application file for complete search history.

(56) References Cited

U.S. PATENT DOCUMENTS 5,235,227 A 8/1993 Fazekas
6,104,570 A 8/2000 Pelstring
(Continued)

FOREIGN PATENT DOCUMENTS

DE 195 10 729 A1 9/1996
DE 100 19 914 A1 2/2001
(Continued)

OTHER PUBLICATIONS

International Search Report issued in corresponding application No. PCT/FR2015/052801 dated Jan. 19, 2016 (6 pages).
(Continued)

*Primary Examiner* — Ramon M Barrera
(74) *Attorney, Agent, or Firm* — Osha Liang LLP

(57) ABSTRACT

The invention relates to an electric machine (1) comprising noise-reducing means (24) designed so as to obtain a resonance frequency of the electric machine within a resonance frequency range that does not match the range of frequency of the harmonics of the electric machine, more precisely between 1500 Hz and 2500 Hz.

10 Claims, 1 Drawing Sheet

Figure 1:
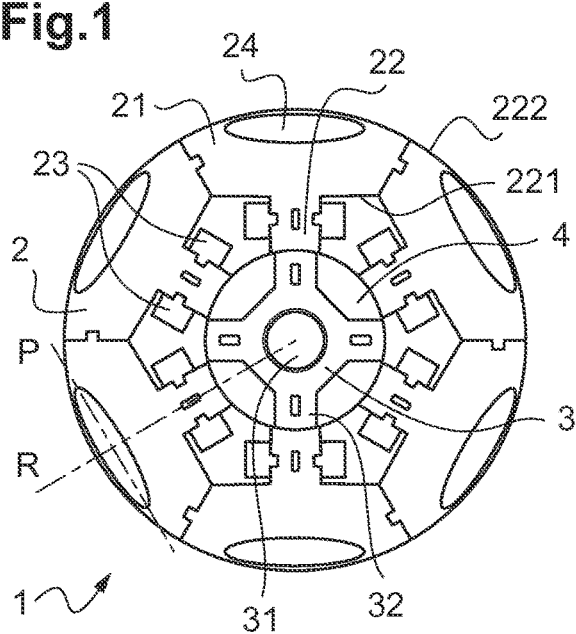

(51) Int. Cl.
F04D 25/06 (2006.01)
F04D 29/66 (2006.01)
H02K 1/24 (2006.01)
H02K 1/27 (2006.01)
H02K 19/10 (2006.01)

(56) References Cited

U.S. PATENT DOCUMENTS 6,144,137 A 11/2000 Engelbert
2004/0119367 A1 6/2004 Hiwaki et al.

FOREIGN PATENT DOCUMENTS

| | | |
|---|---|---|
| DE | 199 60 088 A1 | 3/2001 |
| EP | 0240644 A1 | 10/1987 |
| FR | 2 817 405 A1 | 5/2002 |
| FR | 2 980 526 A1 | 3/2013 |
| JP | S5588544 A | 7/1980 |
| JP | 2000 060059 A | 2/2000 |
| JP | 2002 281698 A | 9/2002 |
| KR | 2002 0057065 A | 7/2002 |

OTHER PUBLICATIONS

Written Opinion of the International Searching Authority issued in corresponding application No. PCT/FR2015/052801 dated Jan. 19, 2016 (8 pages).

ELECTRIC MACHINE COMPRISING NOISE-REDUCING MEANS

This invention relates to the field of electric machines and relates more particularly to electric machines comprising at least one stator.

An electric machine is a machine, also called a motor, which comprises at least one stator. The stator comprises teeth forming coils. Powering each of the coils creates a magnetic field within the stator, with a rotor orienting itself along the field lines.

In the field of motor vehicles, these electric machines are used, for example, in electrical systems such as supercharged electric compressors. For example, these machines are used in the induction system in order to improve the vehicle's performance, to compensate for the lag time of a conventional turbocharger on start-up, or during the vehicle's transient phases.

However, this type of machine is a source of noise. In fact, the vibrations of the motor can interfere with the resonance frequency of the machine and cause additional vibrations and thus high-frequency micro-displacements within the audible range of the human ear. The vibrations are transmitted along the entire structure of the machine and spread through the air and into the machine's supports. Although the noises driven by the machine towards the support can be reduced by dampers, the intrinsic noises of the machine are more difficult to deal with.

One solution to this noise involves reducing the effects of the radial forces. The effects of the radial forces are reduced, for example, by creating recesses in the material on the external face of the stator, in the extension of the stator teeth. This solution enables a gain in deformation, allowing the radial forces on the part in contact with the stator to be reduced by 10%. This gain helps to partially reduce the noise but it still remains audible to the human ear.

The aim of this invention is therefore to overcome one or more of the drawbacks of machines of the prior art by proposing an electric machine configured so as to limit sound pollution.

For this reason, the present invention proposes an electric machine comprising noise-reducing means configured so as to achieve a resonance frequency of the electric machine lying within a resonance frequency range that does not match the frequency range of the harmonics of the electric machine.

According to an embodiment of the invention, the noise reduction means are configured to obtain a resonance frequency of the electric machine between 1500 Hz and 2500 Hz.

According to an embodiment of the invention, the machine comprises at least one stator, the noise-reducing means comprising at least one recess, formed in the stator, associated with means to mechanically insulate the stator in relation to the rest of the electric machine.

According to an embodiment of the invention, the insulation means comprise axial insulation means and radial insulation means.

According to an embodiment of the invention, the axial insulation means are formed by at least two seals arranged at the radial ends of the stator.

According to an embodiment of the invention, the radial insulation means are formed by resin covering the external radial surface of the stator.

According to an embodiment of the invention, the recess extends longitudinally in the stator body parallel to a longitudinal axis of the stator and has any geometrical form that allows the mechanical stresses on the stator to be limited.

According to an embodiment of the invention, the width of the internal recess is less than the width of a stator tooth and is arranged in the axis of a stator tooth.

According to an embodiment of the invention, the internal recess is formed in the stator body at a sufficient distance from an internal face 221 of the stator body so as not to disturb the magnetic field.

According to an embodiment of the invention, the stator comprises at least two external recesses formed on the external face of the stator.

The invention also relates to the use of the electric machine according to the invention in an electric supercharger for a motor vehicle.

The invention also relates to an electric supercharger equipped with an electric machine according to the invention.

Figure 2:
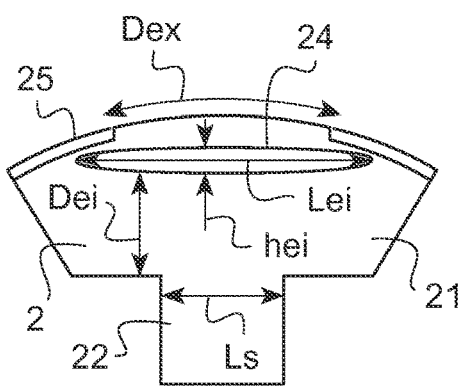
Figure 3:
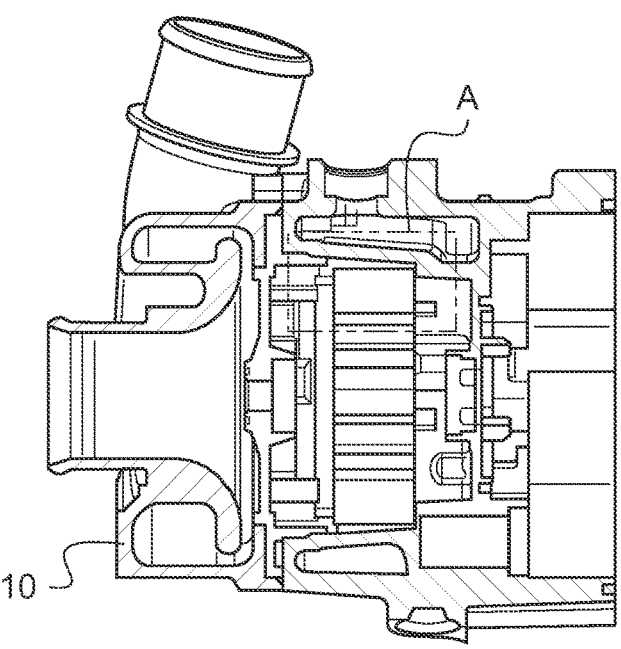
Figure 4:
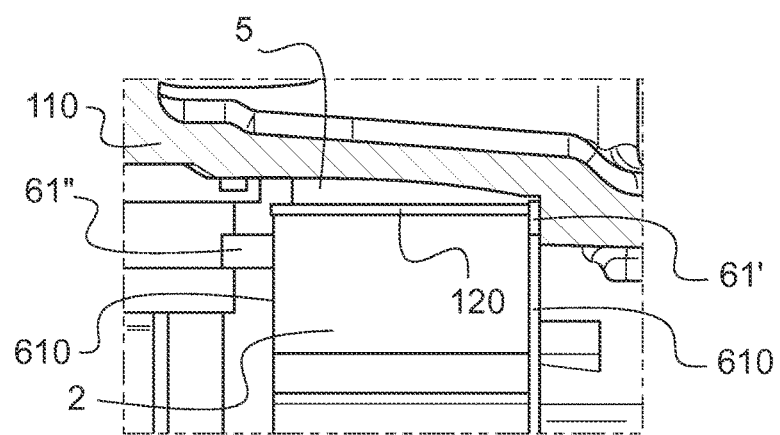

Further aims, features and advantages of the invention will emerge more clearly from the following description with reference to the accompanying Figures, given by way of example, in which:

FIG. 1 is a schematic representation of a cross-sectional view of a part of the device according to the invention, FIG. 2 is a schematic representation of a detail of a part of the device according to the invention, FIG. 3 is a schematic representation of a cross-sectional view of the device according to the invention, FIG. 4 is a schematic representation of Detail A of the device according to the invention, shown in FIG. 3.

This invention relates to an electric machine 1. The electric machine comprises at least one stator 2, shown in FIGS. 1 and 2. The electric machine also comprises a rotor 3 arranged inside the stator 2. More precisely, the rotor 3 is arranged in a space 4 formed at the center of the stator 2.

According to an embodiment of the invention, the stator is arranged in a recess formed in the body 110 of the electric machine, shown in FIGS. 3 and 4.

According to an embodiment of the invention, the electric machine is a direct- or alternating-current, synchronous or asynchronous machine or any type of electric machine of the same type.

According to an embodiment of the invention, the electric motor is a Switched Reluctance Motor (SRM).

According to an embodiment of the invention, the stator comprises a body formed by a stack of thin sheets forming a ring, also called a laminated core, the internal face of which is provided with recesses open to the interior to receive the phase windings that form a coil.

According to an embodiment of the invention, the rotor has permanent magnets.

The stator 2 is formed of at least one body 21. According to an embodiment of the invention, the stator is formed of several bodies. The stator is also formed of several teeth 22. The teeth 22 are arranged on the inner face 221 of the stator body delimiting the space 4 in which the rotor is located. The stator 2 comprises n teeth 22, n being between 4 and 12, and very preferably 6. Around each tooth 22 a winding is arranged that thus forms the coils 23 of the stator. The supply of each of these coils 23 allows a magnetic field to be created in the stator 2.

According to an embodiment of the invention, the rotor 3 comprises rotor teeth 32 oriented along the field lines of the stator 2. The number of teeth of the rotor 3 ranges between 2 and 8, and preferably 4.

The applicant disclosed that certain harmonics of the machine, when they match the resonance frequency of the machine, are particularly audible to the human ear. These harmonics then become a source of noise.

So, within the scope of the invention, noise reduction is achieved by defining a resonance frequency range of the machine that does not match the harmonics of the electric machine.

For example, in the case of an electric machine comprising 6 stator teeth, and according to an embodiment of the invention also comprising 4 rotor teeth, harmonics 4 and 8 are particularly audible.

If the electric machine has an operating speed of rotation of between 35000 rpm (3684 rad/s) and 75000 rpm (7894 rad/s), 60 rpm being 1 Hz:
harmonic 4 (H4) varies between 35000/60*4=2333 Hz and 75000/60*4=5000 Hz,
harmonic 8 (H8) varies between 35000/60*8=4666 Hz and 75000/60*8=10000 Hz.

Thus, in the present case, the frequency range in which the harmonics will match the vibration frequency of the machine and be a source of noise is located between 2333 Hz and 10000 Hz.

Below 1500 Hz, when, for example, the machine is used in a motor vehicle, the vibrations of the vehicle's engine can interfere with the resonance frequency of the product and cause considerable mechanical stress.

The resonance frequency range in which sound pollution will be limited lies between 1500 Hz and 2500 Hz, and beyond 10000 Hz.

The aim of the present invention is therefore to propose an electric machine comprising noise-reducing means configured so as to obtain a resonance frequency of the electric machine within a resonance frequency that does not match the frequency range of the harmonics.

More precisely, the noise-reducing means are configured so as to achieve a resonance frequency of the electric machine of between 1500 Hz and 2500 Hz.

According to an embodiment of the invention, the noise-reducing means comprise at least one recess 24 formed in the stator 2 associated with means 61', 61", 5 to mechanically insulate the stator in relation to the rest of the electric machine 1. This association gives the system the necessary flexibility to prevent the above-mentioned resonance frequencies.

Within the scope of the invention, the stator 2 comprises at least one internal recess 24. This internal recess 24 is formed in the actual body 21 of the stator. The internal recess 24 is formed in the body 21 of the stator 2 and extends longitudinally, along the longitudinal axis 31 of the stator, over at least part of the stator, into the body 21 of the stator 2. More precisely, the internal recess 24 extends parallel to the axis 31 of the stator.

Within the scope of the invention, the longitudinal axis 31 of the stator is defined as being the axis 31 along which the stator extends, passing through the center of the stator, namely the axis 31 around which the stator is arranged.

According to an embodiment of the invention, the internal recess 24 extends longitudinally along the entire length of the stator 2.

According to an embodiment of the invention, the width $L_{ei}$ of the internal recess 24 is greater than the width $L_s$ of a tooth 22 of the stator 2.

Within the scope of the invention, the width of the recess and stator teeth is defined by the magnitude oriented along a plane P perpendicular to a plane passing through the radius R of the stator, in contrast to the height, which is defined by the magnitude passing through the radius R of the stator.

Within the scope of the invention, the internal recess 24 has any possible geometric form. More precisely, the internal recess 24 has any geometric form limiting the mechanical stress on the stator 2. In fact, it is the mechanical stress that contributes towards sound pollution by promoting radial forces. Reducing the effects of these forces thus limits sound pollution.

According to an embodiment of the invention, the internal recess 24 is a cylinder whose generatrix has any form enabling the mechanical stress on the stator to be limited.

According to an embodiment of the invention, the internal recess 24 is round.

According to an embodiment of the invention, the internal recess 24 is oval, its width $L_{ei}$ being greater than its height $h_{ei}$.

According to an embodiment of the invention, the internal recess is square or rectangular. For example, the internal recess 24 is rectangular or square, with rounded corners.

According to an embodiment of the invention, the internal recess 24 is elliptical, more precisely the internal recess 24 is an elliptical cylinder whose width is greater than its height.

The internal recess 24 is arranged in the axis of a stator tooth 22. More precisely, the internal recess 24 is arranged in a part of the body 21 of the stator 2 extending a tooth 22 of the stator.

According to an embodiment, the internal recess 24 is formed in the stator body at a sufficient distance from the internal face 221 of the stator body so as not to disturb the magnetic field. More precisely, the shorter distance $D_{ei}$ between an edge of the internal recess 24 and the internal face 221 of the stator body is greater or the same as the width of a stator tooth divided by two ($L_s/2$). Such an arrangement avoids changing the magnetic field of the electric machine.

According to an embodiment of the invention, the internal recess 24 is arranged in the body 21 of the stator 2 and on the periphery of the body 21. This means that the internal recess 24 is closer to the external face 222 of the stator 2 than the internal face 221 of the stator 2.

Within the scope of the invention, the external face 222 of the stator 2 is that which does not comprise a tooth 22 and that is arranged on the outside of the stator if we consider that the internal face 221 of the stator delimits an area 4 of the stator 2 in which the rotor 3 is arranged.

According to an embodiment of the invention, the stator 2 comprises a number of recesses 24 identical to the number of teeth 22 of the stator. For example, if the stator comprises six teeth, the stator comprises six internal recesses 24.

Within the scope of the invention, the noise-reducing means also comprise means for the acoustic insulation of the stator in relation to the rest of the electric machine.

According to an embodiment of the invention, the acoustic insulation means comprise axial acoustic insulation means 61', 61" and radial acoustic insulation means 5.

According to an embodiment of the invention, the axial acoustic insulation means 61', 61" are formed by at least two seals 61', 61" arranged at the radial ends 610 of the stator 2. The radial ends 610 of the stator correspond to the two external surfaces of the stator 2 arranged perpendicular to the axis 31 of the stator 2.

According to an embodiment of the invention, the seals 61', 61" are elastomer seals. The seals 61', 61" are O-rings. According to an embodiment of the invention, the seals 61', 61" are arranged around the periphery of the surface 610 forming the ends of the stator 2.

According to an embodiment of the invention, the radial acoustic insulation means 5 are formed by resin covering the external radial surface of the stator 2.

According to an embodiment of the invention, the resin 5 totally fills the void between the radial surface of the stator 2 and the body 110 of the electric machine 1.

According to an embodiment of the invention, the resin is a flexible resin.

According to an embodiment of the invention, the resin has a Shore hardness of 80 A or less, preferably a Shore hardness of 60 A or less.

According to an embodiment of the invention, when the stator 2 is formed of several parts, the electric machine comprises and aluminum ring 120 arranged between the stator 2 and the resin 5.

According to a variation of the invention, the stator 2 also comprises at least one external recess 25 formed on the external face of the stator, shown in FIG. 2.

This external recess 25 forms a groove oriented along the axis 31 of the rotor 3. The external recess 25 is offset in relation to the teeth 22 of the stator. The external recess 25 is centered between two internal recesses 24.

According to an embodiment of the invention, the width of the external recess 25 is such that it overlaps, at each of its sides, an internal recess 24.

According to an embodiment of the invention, the machine comprises two external recesses 25, the distance $D_{ex}$ between two external recesses 25 being less than the width $L_{ei}$ of an internal recess 24. The stator 2 thus comprises an alternation of internal recesses 24 and external recesses 25. The depth of the external recess 25 is within 0 and a remaining thickness of the stator body greater than or equal to the width of a stator tooth divided by two ($L_s/2$). Within the scope of the invention, remaining thickness means the remaining thickness between the bottom of the recess and the internal face 221 of the stator or the start of a stator tooth 22.

According to an embodiment of the invention, the stator 2 comprises a number of external recesses 25 identical to the number of stator teeth 22. For example, if the stator comprises six teeth, the stator comprises six external recesses.

Such an electric machine according to the invention enables a gain of 8 to 17 dB depending on the speeds of rotation of the engine of the vehicle in which the machine is used.

The noise emitted by the electric machine is thus no longer regarded as sound pollution by the human ear.

The invention also concerns the use of such a machine according to the invention in an electric supercharger 10 equipped with such a machine 1 according to the invention. More precisely, the invention also relates to an electric compressor 10 equipped with a switched reluctance motor according to the invention.

The scope of the present invention is not limited to the details given above and permits embodiments in numerous other specific forms without departing from the field of application of the invention. Consequently, the present embodiments must be considered as being by way of illustration and can be changed without, however, departing from the scope defined by the claims.

The invention claimed is:

1. An electric machine comprising:
noise-reducing means configured to achieve a resonance frequency of the electric machine lying within a resonance frequency range that does not match the frequency range of the harmonics of the electric machine;
at least one stator, wherein a body of the stator is formed from multiple parts; and
means to mechanically insulate the stator in relation to the rest of the electric machine, wherein the insulation means comprise axial insulation means and radial insulation means,
wherein the frequency range of the harmonics is between 1500 Hz and 2500 Hz.

2. The electric machine according to claim 1, wherein the noise-reducing means comprises at least one internal recess, formed in the stator, and the internal recess is associated with the insulation means.

3. The electric machine according to claim 1, wherein the axial insulation means are formed by at least two seals arranged at radial ends of the stator.

4. The electric machine according to claim 1, wherein the radial insulation means are formed by resin covering an external radial surface of the stator.

5. The electric machine according to claim 2, wherein the internal recess extends longitudinally in the body of the stator parallel to a longitudinal axis of the stator and has a geometrical form that allows mechanical stresses on the stator to be limited.

6. The electric machine according to claim 2, wherein a width $L_{ei}$ of the internal recess is greater than a width $L_s$ of a tooth of the stator and is arranged in an axis of the tooth of the stator.

7. The electric machine according to claim 2, wherein the internal recess is formed in the body of the stator at a sufficient distance from an internal face of the stator body so as not to disturb a magnetic field.

8. The electric machine according to claim 2, wherein the stator comprises at least two external recesses formed on an external face of the stator.

9. The electric machine according to claim 1, wherein the electrical machine is used in an electric supercharger for a motor vehicle.

10. An electric supercharger equipped with an electric machine according to claim 1.

* * * * *